United States Patent
Mehrotra

(10) Patent No.: US 10,558,758 B2
(45) Date of Patent: Feb. 11, 2020

(54) ENHANCING A COMPUTER TO MATCH EMOTION AND TONE IN TEXT WITH THE EMOTION AND TONE DEPICTED BY THE COLOR IN THE THEME OF THE PAGE OR ITS BACKGROUND

(71) Applicant: International Business Machines Corporation, Armonk, NY (US)

(72) Inventor: Mudit Mehrotra, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 15/821,053

(22) Filed: Nov. 22, 2017

(65) Prior Publication Data

US 2019/0155906 A1    May 23, 2019

(51) Int. Cl.
*G06F 17/27* (2006.01)
*G06F 3/0484* (2013.01)

(52) U.S. Cl.
CPC ........ *G06F 17/2785* (2013.01); *G06F 3/0484* (2013.01); *G06F 2203/011* (2013.01)

(58) Field of Classification Search
CPC combination set(s) only.
See application file for complete search history.

(56) References Cited

U.S. PATENT DOCUMENTS

| | | | |
|---|---|---|---|
| 2013/0063256 A1 | 3/2013 | Tartz et al. | |
| 2013/0253910 A1 | 9/2013 | Turner et al. | |
| 2014/0195619 A1 | 7/2014 | Hodjat | |
| 2015/0370921 A1* | 12/2015 | Moriguchi | G06F 3/048 707/748 |
| 2015/0378537 A1 | 12/2015 | Marimuthu et al. | |
| 2016/0285810 A1* | 9/2016 | Bai | H04L 51/16 |
| 2018/0212983 A1* | 7/2018 | Gonzales, Jr. | H04L 63/102 |

OTHER PUBLICATIONS

Carlo Strapparava et al.; The Color of Emotions in Text; Proceedings of the 2nd Workshop on Cognitive Aspects of the Lexicon ( CogALex 2010), pp. 28-32, Beijing, Aug. 2010. (Year: 2010).*

(Continued)

*Primary Examiner* — Abul K Azad
(74) *Attorney, Agent, or Firm* — Yee & Associates, P.C.

(57) ABSTRACT

The illustrative embodiments provide for a computer-implemented method of automatically measuring an emotion or a tone in received electronic text. A selected color scheme chosen for the electronic text is received at a processor, the color scheme is selected to indicate an intended emotion or an intended tone intended for future electronic text that is to be received. Actual electronic text is received at the processor. An estimated emotion or an estimated tone for the actual electronic text is measured by the processor. The estimated emotion or the estimated tone is compared by the processor to the intended emotion or the intended tone. Responsive to a mismatch between the estimated emotion or the estimated tone and the intended emotion or the intended tone, an alert is transmitted by the processor to a display device that indicates the mismatch.

12 Claims, 4 Drawing Sheets

(56) References Cited

OTHER PUBLICATIONS

Wang et al.; Communicating Emotions in Online Chat Using Physiological Sensors and Animated Text; Proceeding CHI '04 Extended Abstracts on Human Factors in Computing Systems; pp. 1171-1174; Vienna, Austria—Apr. 24-29, 2004. (Year: 2004).*

"The Psychology of Color in Logo Design," The Logo Company, https://thelogocompany.net/blog/infographics/psychology-color-logo-design/, accessed Nov. 15, 2017, 6 pages.

"Color can Influence Emotions in a way that few other mediums can," Digital Skratch, http://www.digitalskratch.com/color-psychology.php, accessed Nov. 15, 2017, 7 pages.

"The Psychology of Color," Visual Impact Systems, https://visualimpactsystems.com/the-psychology-of-color, accessed Nov. 15, 2017, 10 pages.

"The Emotion of Color: How Color Impacts Experience," Factory 360 Experiential Marketing Agency, https://www.factory360.com/the-emotion-of-color-how-color-impactsexperience/, accessed Nov. 15, 2017, 4 pages.

\* cited by examiner

ENHANCING A COMPUTER TO MATCH EMOTION AND TONE IN TEXT WITH THE EMOTION AND TONE DEPICTED BY THE COLOR IN THE THEME OF THE PAGE OR ITS BACKGROUND

BACKGROUND INFORMATION

1. Field

The present disclosure relates to methods and devices for enhancing a computer to do what previously only a human being could do. More particularly, the present disclosure relates to enhancing a computer to match an emotion and a tone in text with the emotion and the tone depicted by the color in the theme of the page or its background.

2. Background

It is well known in the art of computer science that computers cannot accurately gauge human emotion or tone only from text. Previously, only a human could accurately gauge emotion or tone from text. Thus, there is a long felt need for a computer to perform this task.

SUMMARY

The illustrative embodiments provide for a computer-implemented method of automatically measuring an emotion or a tone in received electronic text. The computer-implemented method includes receiving, at a processor, a selected color scheme chosen for the electronic text, the color scheme is selected to indicate an intended emotion or an intended tone intended for future electronic text that is to be received. The computer-implemented method also includes receiving, at the processor, actual electronic text. The computer-implemented method also includes measuring, by the processor, an estimated emotion or an estimated tone for the actual electronic text. The computer-implemented method also includes comparing, using the processor, the estimated emotion or the estimated tone to the intended emotion or the intended tone. The computer-implemented method also includes responsive to a mismatch between the estimated emotion or the estimated tone and the intended emotion or the intended tone, transmitting, by the processor, an alert to a display device that indicates the mismatch.

The illustrative embodiments also provide for a computer-implemented method of automatically measuring an emotion or a tone in received electronic text. The computer-implemented method includes receiving, at a processor, electronic text. The computer-implemented method also includes estimating, based on the electronic text, an estimated emotion or an estimated tone associated with the electronic text. The computer-implemented method also includes determining, by the processor using the estimated emotion or the estimated tone, a recommended theme color for the electronic text. The computer-implemented method also includes displaying, by the processor on a display device, the recommended theme color to be associated with the electronic text.

The illustrative embodiments also contemplate a computer which has a computer-recordable storage medium containing program code, which when executed by a processor of the computer, implements the above computer-implemented method. The illustrative embodiments also contemplate computer-recordable storage medium containing program code, which when executed by a processor, implements the above computer-implemented method. Other variations are possible, as described below.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
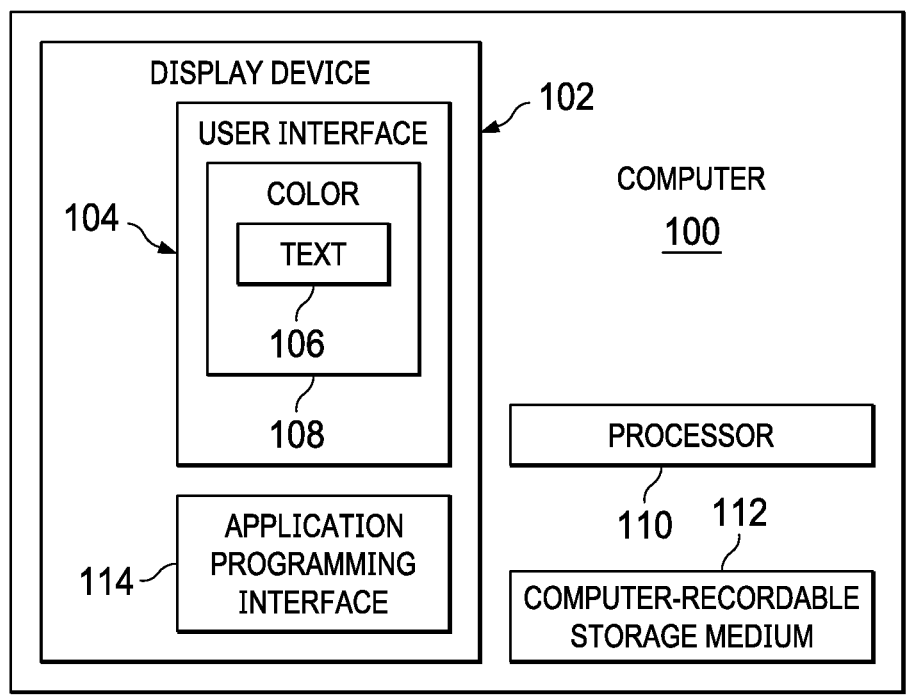
FIG. 1 illustrates a computer displaying text together with color, in accordance with an illustrative embodiment.

The illustrative embodiments relate to for methods and devices for enhancing a computer to do what previously only a human being could do. More particularly, the present disclosure relates to enhancing a computer to match emotion and tone in text with the emotion and the tone depicted by the color in the theme of the page or its background.

The illustrative embodiments recognize and take into account that there is a clear and distinct link between color and emotion. Some companies create their brands and logos based on this fact. Thus, it can be further deduced that color and images on a page affects the emotion of the reader, as well as how the content on the page is received by the reader. Accordingly, content writers and editors should be careful that they are matching the emotion and tone of the written content and text with that of the color theme and color of the images on the page so there is no dissonance for the reader in grasping the message.

This effect expands into various mediums by which content is shared with readers in marketing communications and content, whether through an email, on a website, on a brochure, and other media. Hence, this effect may be important for the marketing discipline where there is a lot of competition to grab a customer's attention through marketing material.

The illustrative embodiments also recognize and take into account that currently only humans can associate text to emotion. This evaluation happens via gut feeling and there is no measure in place to ensure that there is no mismatch between the tone and emotion of a color theme on a page and that of the text which is a part of that the page. However, humans are prone to mistakes. For companies, mistakes can result in monetary losses, since the impact expected to be created by the campaign did not occur. Thus, there is a need that emerges to provide this capability to measure it specifically and precisely.

The illustrative embodiments therefore provide for a framework which assists content designers, creators, editors and reviewers to ensure that the color scheme being used is in synch with the emotion and tone of the text. Prior to this disclosure, there was no way to measure the specific tone and emotion in text quickly in an electronic medium, which made even thinking about this idea tough. However, the illustrative embodiments provide for cognitive application programming interfaces measuring emotion and tone in text.

The illustrative embodiments contemplate at least two primary embodiments. First, based on a color scheme chosen for the content, a computer can measure the tone of the text being created and provide feedback regarding the match or mismatch between the emotion behind the color and the text. Second, if the text is created first, the computer can recommend what should be the theme color that matches the emotion of the text created so that the emotion of the two is the same and in sync.

To accomplish these goals, the illustrative embodiments provide for the cognitive application programming interfaces described above, combined with a data repository with color and emotion details represented by the color. This data repository will be used to provide inputs from the color side. On the measurement of emotion in the text being written, the illustrative embodiments can be accomplished by using the cognitive application programming interfaces described above, along with using the data repository to match the measured emotion with the repository.

Psychologists and cognitive scientists have already performed research on the connection between color and emotion. Thus, the data repository of the illustrative embodiments can describe the emotion or tone behind each color. The data repository may be queried both from the color number or from the emotion or tone. Guidance can be taken from color formats such as Pantone and CMYK (cyan, magenta, yellow, and key) to build this repository. This data repository or database is searchable both by the color to come up with the emotion depicting the color, as well as by emotion in order to bring out the matching color.

Additionally, the illustrative embodiments provide for a plugin which can be associated with an existing application, including but not limited to a web browser, a word processing program, a text editor, or a portable document file editor. The plugin responds on the input of a selected text. This plugin uses the text as an input to query the application programming interface and return the emotion and tone depicted in the text.

The illustrative embodiments also recognize and take into account that a content creator can pick a color scheme as the background and start writing. Once done with the writing, the content creator calls the plugin to evaluate whether the tone and emotion of the color and text match. If they do not match, then the text can be edited until a match is achieved.

In yet another illustrative embodiment, the text is written first. In this case, once the text is completed, the emotion behind the text is measured and used to select a matching theme color for the text. This result is achieved by using the plugin described above to query the color database with the value of the emotion in the written text and getting a color as a response.

Thus, the illustrative embodiments provide for selecting the combination of emotion and tone to be created and the software or hardware of the illustrative embodiments. The illustrative embodiments automatically recommend the theme color that should be used. Similarly, if a user starts with an existing theme that is pre-defined, and the user starts writing, the software or hardware of the illustrative embodiments would inform the user whether the text content is in sync with the emotion of the color theme.

The illustrative embodiments recognize and take into account that other efforts regarding emotion and tone matching to text have failed. For example, other efforts require already written text that depends on the viewing device by the end user to interpret and assign color. There is no color assigned by the content author at the time of text creation. This could be limited by the viewing device capabilities to interpret and assign the right color. In contrast, the illustrative embodiments assist the content editor in creating better content by enabling a match between the emotion in the content and background color at the time of content creation. Currently, this process is based on human intuition, and thus highly subjective and differs from one content author to another and one user to another. In contrast, the illustrative embodiments are based on objective measures and thus more accurate.

The illustrative embodiments also recognize and take into account that other efforts regarding emotion to text matching do not provide a match or a mismatch of the emotion between the color and text being created. Only assigning a color value is not equivalent to the illustrative embodiments, as only assigning a color value does not help the content writers who are the targeted beneficiaries.

The illustrative embodiments also recognize and take into account that other efforts have used haptic feedback as a means of transmitting emotion from one user to another. This approach is limited by the capabilities of the device of the receiving user. In contrast, thee illustrative embodiments match the emotion of text and color at the time of content creation. Other variations of the illustrative embodiments are possible. Thus, reference is now made to the following figures.

FIG. 1 illustrates a computer displaying text together with color, in accordance with an illustrative embodiment. Computer 100 may be, for example, data processing system 500 of FIG. 5. Computer 100 includes display device 102 which presents user interface 104. User interface 104 presents text 106 together with color 108.

Color 108 may be associated with text 106 in various ways. In one illustrative embodiment, color 108 forms a highlighted background to text 106. In other illustrative embodiments, color 108 may take the form of the alphanumeric or other text symbols themselves, that is, the text itself is colored. In still other illustrative embodiments, color 108 may be presented above, below, or to one side of text 106. Other illustrative embodiments are also possible.

The illustrative embodiments are implemented using processor 110 operating together with computer-recordable storage medium 112. Computer-recordable storage medium 112 may include or may be the data repository described above. Thus, computer-recordable storage medium 112 includes color to emotion matching. As used herein, the term "computer-recordable storage medium" refers only to tangible, physical media.

The illustrative embodiments are also implemented using application programming interface 114, also referred-to as an "API". Application programming interface 114 may be the application programming interface described above. Application programming interface 114 may be a plugin which interacts with the software that is used to produce user interface 104.

Figure 2:
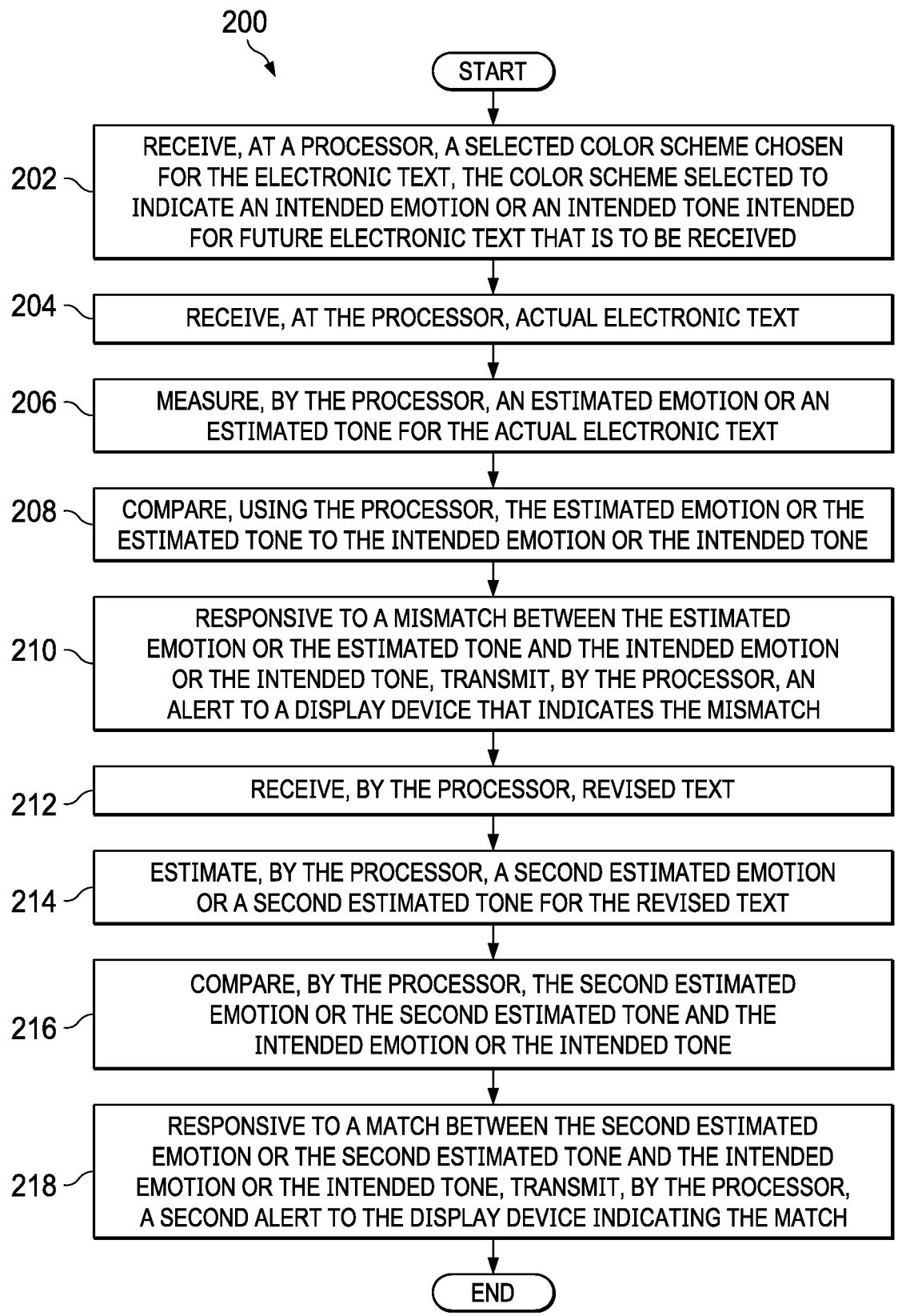
FIG. 2 illustrates a computer-implemented method of automatically measuring an emotion or a tone in received electronic text, in accordance with an illustrative embodiment.

FIG. 2 illustrates a computer-implemented method of automatically measuring an emotion or a tone in received electronic text, in accordance with an illustrative embodiment. Method 200 may be implemented using a data processing system, such as processor 110 of FIG. 1 or data processing system 500 of FIG. 5.

Method 200 includes receiving, at a processor, a selected color scheme chosen for the electronic text, the color scheme selected to indicate an intended emotion or an intended tone intended for future electronic text that is to be received (operation 202). Method 200 also includes receiving, at the processor, actual electronic text (operation 204).

Method 200 also includes measuring, by the processor, an estimated emotion or an estimated tone for the actual electronic text (operation 206). Method 200 also includes comparing, using the processor, the estimated emotion or the estimated tone to the intended emotion or the intended tone (operation 208).

Method 200 also includes, responsive to a mismatch between the estimated emotion or the estimated tone and the intended emotion or the intended tone, transmitting, by the processor, an alert to a display device that indicates the mismatch (operation 210). In one illustrative embodiment, the method may terminate.

However, method 200 may be varied, including additional, expanded, or different operations. For example, in one illustrative embodiment, the selected color scheme is received from a data structure repository which contains details regarding colors as related to emotion or tone.

In another illustrative embodiment, method 200 may also include additional operations. An additional operation may be receiving, by the processor, revised text (operation 212). Another additional operation may be estimating, by the processor, a second estimated emotion or a second estimated tone for the revised text (operation 214).

Another additional operation may be comparing, by the processor, the second estimated emotion or the second estimated tone and the intended emotion or the intended tone (operation 216). Another additional operation may be, responsive to a match between the second estimated emotion or the second estimated tone and the intended emotion or the intended tone, transmitting, by the processor, a second alert to the display device indicating the match (operation 218). In one illustrative embodiment, the method may terminate.

However, method 200 may be still further varied. In another illustrative embodiment, comparing is performed by the processor executing an application programming interface. In this case, the computer-implemented method is performed in an application selected from the group consisting of a web browser, a word processor, an email editor, a portable document format editor, and a text editor. For this particular illustrative embodiment, the computer-implemented method is performed in the web browser, and the application programming interface comprises a plug-in to the web browser.

In yet another illustrative embodiment, receiving the selected color scheme, receiving the actual electronic text, measuring, comparing, and transmitting are performed by a remote server. The remote server provides a service to a client computer from which actual electronic text and the selected color scheme are received. Other variations are possible. Thus, the illustrative embodiments and the claimed inventions are not necessarily limited to the example provided in FIG. 2.

Figure 3:
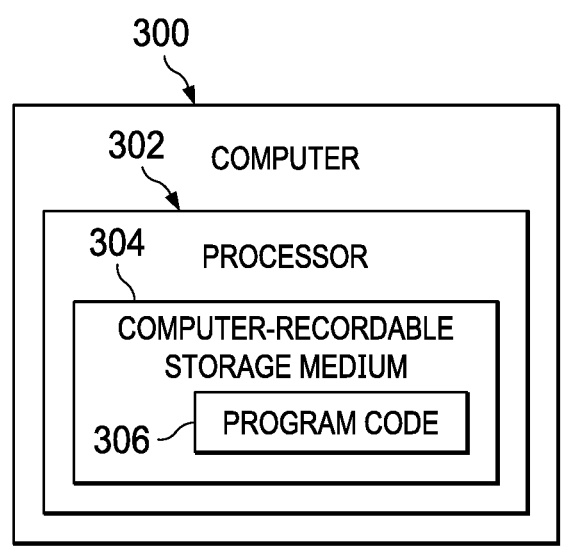
FIG. 3 illustrates a computer having a processor; and a computer-recordable storage medium storing program code which, when executed by the processor, performs a computer-implemented method of automatically measuring an emotion or a tone in received electronic text, in accordance with an illustrative embodiment.

FIG. 3 illustrates a computer including a processor; and a computer-recordable storage medium storing program code which, when executed by the processor, performs a computer-implemented method of automatically measuring an emotion or a tone in received electronic text, in accordance with an illustrative embodiment. Computer 300 may be, for example, processor 100 of FIG. 1 or data processing system 500 of FIG. 5. Computer 300 may implement method 200 of FIG. 2.

Computer 300 includes processor 302 and computer-recordable storage medium 304 for storing program code 306. Program code 306, when executed by processor 302, performs a computer-implemented method of automatically measuring an emotion or a tone in received electronic text. Program code 302 includes program code for receiving, at a processor, a selected color scheme chosen for the electronic text, the color scheme selected to indicate an intended emotion or an intended tone intended for future electronic text that is to be received.

Program code 306 also includes program code for receiving, at the processor, actual electronic text. Program code 306 also includes program code for measuring, by the processor, an estimated emotion or an estimated tone for the actual electronic text. Program code 306 also includes program code for comparing, using the processor, the estimated emotion or the estimated tone to the intended emotion or the intended tone. Program code 306 also includes program code for responsive to a mismatch between the estimated emotion or the estimated tone and the intended emotion or the intended tone, transmitting, by the processor, an alert to a display device that indicates the mismatch.

Computer 300 may be varied. For example, the selected color scheme may be received from a data structure repository which contains details regarding colors as related to emotion or tone.

In another example, the program code further includes program code for receiving, by the processor, revised text; program code for estimating, by the processor, a second estimated emotion or a second estimated tone for the revised text; and program code for comparing, by the processor, the second estimated emotion or the second estimated tone and the intended emotion or the intended tone; and program code for responsive to a match between the second estimated emotion or the second estimated tone and the intended emotion or the intended tone, transmitting, by the processor, a second alert to the display device indicating the match.

In yet another illustrative embodiment, program code for comparing is executed by the processor using an application programming interface. In this case, the program code is executed in an application selected from the group consisting of: a web browser, a word processor, an email editor, a portable document format editor, and a text editor. For this particular example, the program code is executed in the web browser, and wherein the application programming interface comprises a plug-in to the web browser.

In still another illustrative embodiment, the program code for receiving the selected color scheme, the program code for receiving the actual electronic text, the program code for measuring, the program code for comparing. In this case, the program code for transmitting is executed at a remote server providing a service to a client computer from which actual electronic text and the selected color scheme are received. Other variations are possible. Thus, the illustrative embodiments and the claimed inventions are not necessarily limited to the example provided in FIG. 3.

Figure 4:
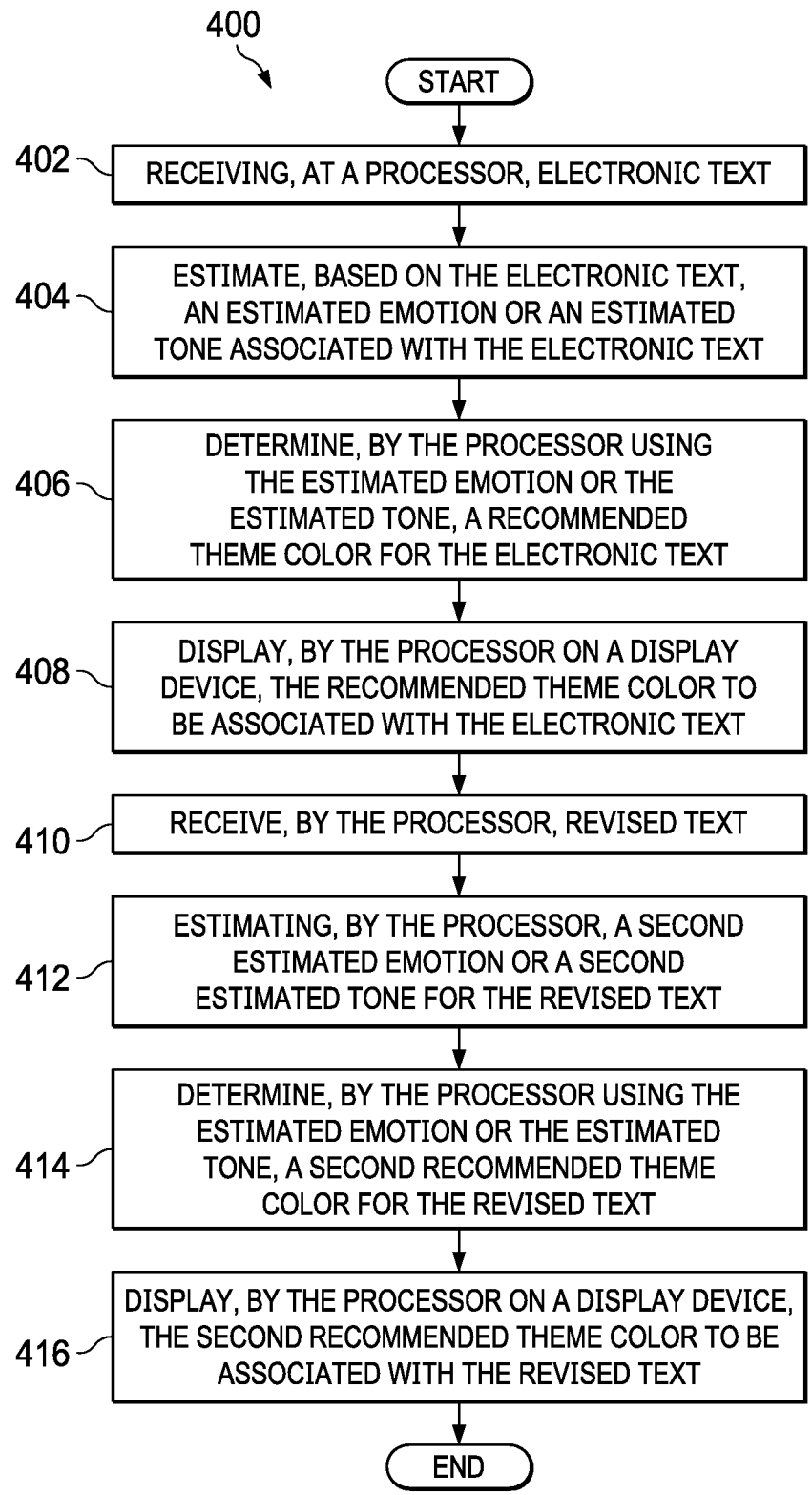
FIG. 4 illustrates a computer-implemented method of automatically measuring an emotion or a tone in received electronic text, in accordance with an illustrative embodiment.

FIG. 4 illustrates a computer-implemented method of automatically measuring an emotion or a tone in received electronic text, in accordance with an illustrative embodiment. Method 400 may be implemented using a data processing system, such as processor 100 of FIG. 1 or data processing system 500 of FIG. 5. Method 400 is a variation of method 200 of FIG. 2.

Method 400 includes receiving, at a processor, electronic text (operation 402). Method 400 also includes estimating, based on the electronic text, an estimated emotion or an estimated tone associated with the electronic text (operation 404).

Method 400 also includes determining, by the processor using the estimated emotion or the estimated tone, a recommended theme color for the electronic text (operation 406). Method 400 also includes displaying, by the processor on a display device, the recommended theme color to be associated with the electronic text (operation 408). In one illustrative embodiment, the method may terminate.

Method 400 may be varied, and may include more, expanded, and additional steps. For example, the recommended theme color may be determined by comparing the estimated emotion or the estimated tone to a data structure repository which contains details regarding colors as related to emotion or tone.

In another example, method 400 includes additional steps. For example, Method 400 also may include receiving, by the processor, revised text (operation 410). Method 400 also may include estimating, by the processor, a second estimated emotion or a second estimated tone for the revised text (operation 412).

Method 400 also may include determining, by the processor using the estimated emotion or the estimated tone, a second recommended theme color for the revised text (operation 414). Method 400 also may include displaying, by the processor on a display device, the second recommended theme color to be associated with the revised text (operation 416). In one illustrative embodiment, the method may terminate.

Method 400 may be yet further varied. For example, determining may be performed by the processor executing an application programming interface. In this case, the computer-implemented method may be performed in an application selected from the group consisting of a web browser, a word processor, an email editor, a portable document format editor, and a text editor. The application programming interface may be a plug-in to the application. In another variation, receiving, estimating, and determining are performed by a remote server.

Other variations are possible. Thus, the illustrative embodiments and the claimed inventions are not necessarily limited to the example provided in FIG. 4.

Figure 5:
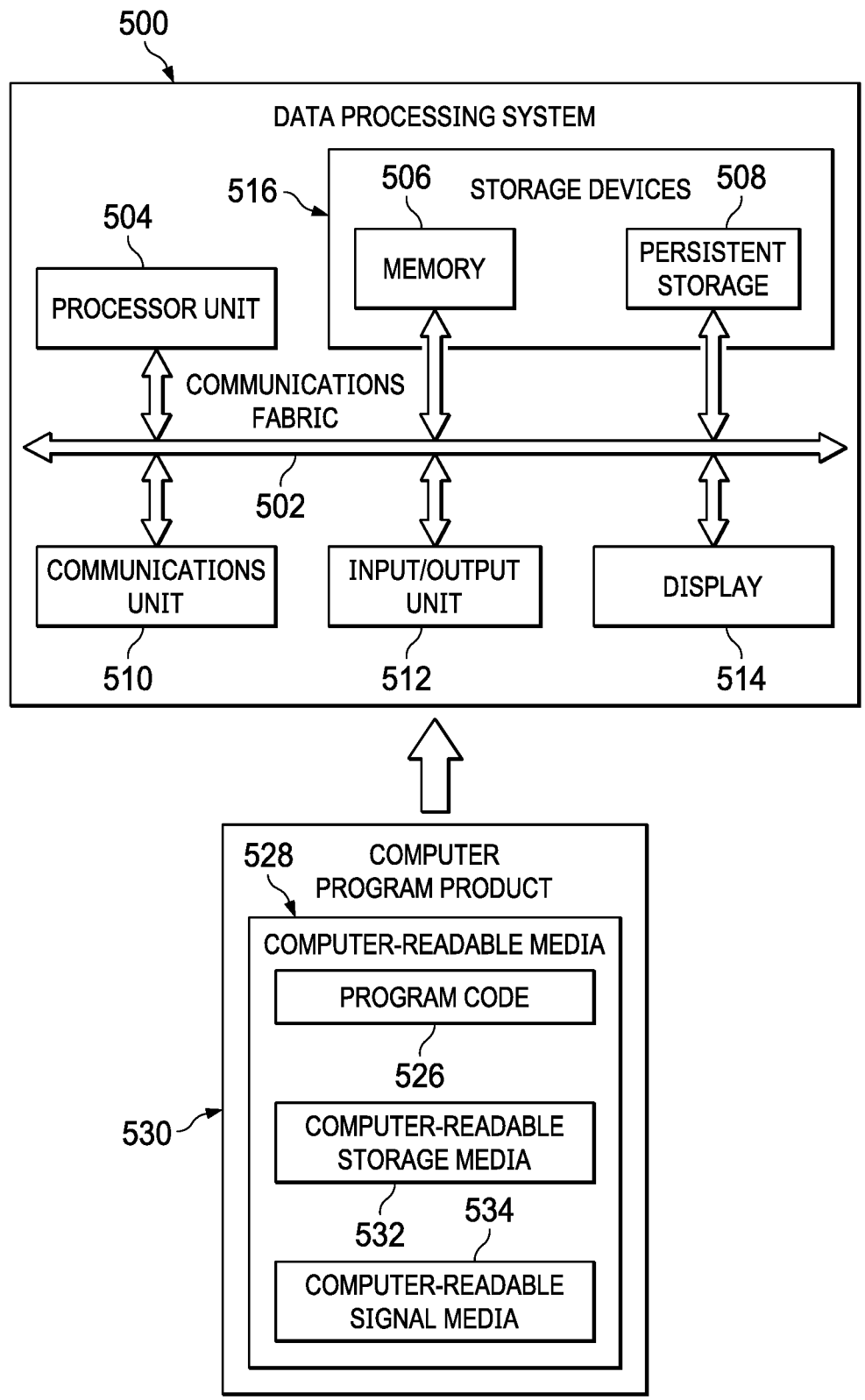
FIG. 5 illustrates a data processing system, in accordance with an illustrative embodiment.

With reference now to FIG. 5, a diagram of a data processing system is depicted in accordance with an illustrative embodiment. Data processing system 500 is an example of a computer, in which computer-readable program code or program instructions implementing processes of the illustrative embodiments may be located. In this illustrative example, data processing system 500 includes communications fabric 502, which provides communications between processor unit 504, memory 506, persistent storage 508, communications unit 510, input/output unit 512, and display 514.

Processor unit 504 serves to execute instructions for software applications and programs that may be loaded into memory 506. Processor unit 504 may be a set of one or more hardware processor devices or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

Memory 506 and persistent storage 508 are examples of storage devices 516. A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 506, in these examples, may be, for example, a random-access memory, or any other suitable volatile or non-volatile storage device. Persistent storage 508 may take various forms, depending on the particular implementation. For example, persistent storage 508 may contain one or more devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in this example, provides for communication with other computers, data processing systems, and devices via network communications unit 510 may provide communications using both physical and wireless communications links. The physical communications link may utilize, for example, a wire, cable, universal serial bus, or any other physical technology to establish a physical communications link for data processing system 500. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 500.

Input/output unit 512 allows for the input and output of data with other devices that may be connected to data processing system 500. For example, input/output unit 512 may provide a connection for user input through a keypad, keyboard, and/or some other suitable input device. Display 514 provides a mechanism to display information to a user and may include touch screen capabilities to allow the user to make on-screen selections through user interfaces or input data, for example.

Instructions for the operating system, applications, and/or programs may be located in storage devices 516, which are in communication with processor unit 504 through communications fabric 502. In this illustrative example, the instructions are in a functional form on persistent storage 508. These instructions may be loaded into memory 506 for running by processor unit 504. The processes of the different embodiments may be performed by processor unit 504 using computer-implemented program instructions, which may be located in a memory, such as memory 506. These program instructions are referred to as program code, computer-usable program code, or computer-readable program code that may be read and run by a processor in processor unit 504. The program code, in the different embodiments, may be embodied on different physical computer-readable storage devices, such as memory 506 or persistent storage 508.

Program code 526 is located in a functional form on computer-readable media 528 that is selectively removable and may be loaded onto or transferred to data processing system 500 for running by processor unit 504. Program code 526 and computer-readable media 528 form computer program product 530. In one example, computer-readable media 528 may be computer-readable storage media 532 or computer-readable signal media 534. Computer-readable storage media 532 may include, for example, an optical or magnetic disc that is inserted or placed into a drive or other device that is part of persistent storage 508 for transfer onto a storage device, such as a hard drive, that is part of persistent storage 508. Computer-readable storage media 532 also may take the form of a persistent storage, such as a hard drive, a thumb drive, or a flash memory that is connected to data processing system 500. In some instances, computer-readable storage media 532 may not be removable from data processing system 500.

Alternatively, program code 526 may be transferred to data processing system 500 using computer-readable signal media 534. Computer-readable signal media 534 may be, for example, a propagated data signal containing program code 526. For example, computer-readable signal media 534 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 526 may be downloaded over a network to persistent storage 508 from another device or data processing system through computer-readable signal media 534 for use within data processing system 500. For instance, program code stored in a computer-readable storage media in a data processing system may be downloaded over a network from the data processing system to data processing system 500. The data processing system providing program code 526 may be a server computer, a client computer, or some other device capable of storing and transmitting program code 526.

The different components illustrated for data processing system 500 are not meant to provide architectural limitations to the manner in which different embodiments may be implemented. The different illustrative embodiments may be implemented in a data processing system including components in addition to, or in place of, those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a computer-readable storage device in data processing system 500 is any hardware apparatus that may store data. Memory 506, persistent storage 508, and computer-readable storage media 532 are examples of physical storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, illustrative embodiments of the present invention provide a computer implemented method, computer system, and computer program product for improving security on a computer system by identifying compromised or potentially compromised APIs using machine learning algorithms. Optionally, only identified APIs may be subjected to static testing, as is known in the art.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of automatically measuring an emotion or a tone in received electronic text to determine if a color scheme is in sync with the emotion or the tone of the received electronic text, the computer-implemented method comprising:
    receiving, at a processor, a selected color scheme chosen for the electronic text, the color scheme selected to indicate an intended emotion or an intended tone intended for future electronic text that is to be received;
    receiving, at the processor, actual electronic text;
    measuring, by the processor, an estimated emotion or an estimated tone for the actual electronic text;
    comparing, using the processor, the estimated emotion or the estimated tone to the intended emotion or the intended tone; and
    responsive to a mismatch between the estimated emotion or the estimated tone and the intended emotion or the intended tone, transmitting, by the processor, an alert to a display device that indicates the mismatch, wherein receiving the selected color scheme, receiving the actual electronic text, measuring, comparing, and transmitting are performed by a remote server providing a service to a client computer from which the actual electronic text and the selected color scheme are received.

2. The computer-implemented method of claim 1, wherein the selected color scheme is received from a data structure repository which contains details regarding colors as related to the emotion or the tone.

3. The computer-implemented method of claim 1 further comprising:
receiving, by the processor, revised text;
estimating, by the processor, a second estimated emotion or a second estimated tone for the revised text;
comparing, by the processor, the second estimated emotion or the second estimated tone and the intended emotion or the intended tone; and
responsive to a match between the second estimated emotion or the second estimated tone and the intended emotion or the intended tone, transmitting, by the processor, a second alert to the display device indicating the match.

4. The computer-implemented method of claim 1, wherein the comparing is performed by the processor executing an application programming interface.

5. The computer-implemented method of claim 4, wherein the computer-implemented method is performed in an application selected from a group consisting of: a web browser, a word processor, an email editor, a portable document format editor, and a text editor.

6. The computer-implemented method of claim 5, wherein the computer-implemented method is performed in the web browser, and wherein the application programming interface comprises a plug-in to the web browser.

7. A computer comprising:
a processor; and
a computer-recordable storage medium storing program code which, when executed by the processor, performs a computer-implemented method of automatically measuring an emotion or a tone in received electronic text to determine if a color scheme is in sync with the emotion or the tone of the received electronic text, the program code comprising:
program code for receiving, at the processor, a selected color scheme chosen for the electronic text, the color scheme selected to indicate an intended emotion or an intended tone intended for future electronic text that is to be received;
program code for receiving, at the processor, actual electronic text;
program code for measuring, by the processor, an estimated emotion or an estimated tone for the actual electronic text;
program code for comparing, using the processor, the estimated emotion or the estimated tone to the intended emotion or the intended tone; and
program code for responsive to a mismatch between the estimated emotion or the estimated tone and the intended emotion or the intended tone, transmitting, by the processor, an alert to a display device that indicates the mismatch, wherein the program code for receiving the selected color scheme, the program code for receiving the actual electronic text, the program code for measuring, the program code for comparing, and the program code for transmitting is executed at a remote server providing a service to a client computer from which the actual electronic text and the selected color scheme are received.

8. The computer of claim 7, wherein the selected color scheme is received from a data structure repository which contains details regarding colors as related to the emotion or the tone.

9. The computer of claim 7, wherein the program code further comprises:
program code for receiving, by the processor, revised text;
program code for estimating, by the processor, a second estimated emotion or a second estimated tone for the revised text;
program code for comparing, by the processor, the second estimated emotion or the second estimated tone and the intended emotion or the intended tone; and
program code for responsive to a match between the second estimated emotion or the second estimated tone and the intended emotion or the intended tone, transmitting, by the processor, a second alert to the display device indicating the match.

10. The computer of claim 7, wherein the program code for comparing is executed by the processor using an application programming interface.

11. The computer of claim 10, wherein the program code is executed in an application selected from the group consisting of: a web browser, a word processor, an email editor, a portable document format editor, and a text editor.

12. The computer of claim 11, wherein the program code is executed in the web browser, and wherein the application programming interface comprises a plug-in to the web browser.

* * * * *